United States Patent
Zhang et al.

(10) Patent No.: US 10,887,601 B1
(45) Date of Patent: Jan. 5, 2021

(54) METHOD AND IMAGE PROCESSING DEVICE FOR VIDEO BIT-RATE CONTROL

(71) Applicant: Novatek Microelectronics Corp., Hsinchu (TW)

(72) Inventors: Jingzhi Zhang, Xi'an (CN); Xin Huang, Xi'an (CN)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/600,563

(22) Filed: Oct. 13, 2019

(51) Int. Cl.
| | |
|---|---|
| H04N 19/147 | (2014.01) |
| H04N 19/124 | (2014.01) |
| H04N 19/19 | (2014.01) |
| H04N 19/196 | (2014.01) |
| H04N 19/184 | (2014.01) |
| H04N 19/149 | (2014.01) |
| H04N 19/154 | (2014.01) |

(52) U.S. Cl.
CPC ......... *H04N 19/147* (2014.11); *H04N 19/124* (2014.11); *H04N 19/149* (2014.11); *H04N 19/154* (2014.11); *H04N 19/184* (2014.11); *H04N 19/19* (2014.11); *H04N 19/196* (2014.11)

(58) Field of Classification Search
CPC .. H04N 19/147; H04N 19/154; H04N 19/196; H04N 19/184; H04N 19/124; H04N 19/19; H04N 19/149
USPC ...................................... 375/240.03
See application file for complete search history.

(56) References Cited

U.S. PATENT DOCUMENTS

| | | | |
|---|---|---|---|
| 6,654,417 B1 * | 11/2003 | Hui ...................... | H04N 19/105 375/240.02 |
| 2008/0101410 A1 * | 5/2008 | Barkley ............. | H04N 21/2343 370/473 |
| 2018/0270488 A1 * | 9/2018 | Jeong ................... | H04N 19/172 |

* cited by examiner

Primary Examiner — Allen C Wong
(74) Attorney, Agent, or Firm — JCIPRNET

(57) ABSTRACT

The disclosure provides a method and an image processing device for video bit-rate control. The method includes the following steps. A designated distortion value and a maximum bit-rate value are received. A Lagrange multiplier and a quantization parameter (QP) of a current frame among a sequence of video frames are estimated according to the designated distortion value and the maximum bit-rate value. The current frame is encoded according to the estimated Lagrange multiplier and the estimated QP.

18 Claims, 3 Drawing Sheets

METHOD AND IMAGE PROCESSING DEVICE FOR VIDEO BIT-RATE CONTROL

TECHNICAL FIELD

The disclosure relates to a method and an image processing device for video bit-rate control.

BACKGROUND

With rapidly advancing computer, network, and digital imaging technologies, there is an astronomical amount of video data for a wide range of applications, especially in digital playback devices such as digital video recorders, high-definition televisions, home theater computers, video conferencing devices, smart phones, and so forth. These video systems require high video quality but with tight constraints on storage capacity and channel bandwidth, and therefore a trade-off between encoding bit-rate and distortion becomes a critical issue.

SUMMARY OF THE DISCLOSURE

A method and an image processing device for video bit-rate control are proposed.

According to one of the exemplary embodiments, the method includes the following steps. A designated distortion value and a maximum bit-rate value are received. A Lagrange multiplier and a quantization parameter (QP) of a current frame among a sequence of video frames are estimated according to the designated distortion value and the maximum bit-rate value. The current frame is encoded according to the estimated Lagrange multiplier and the estimated QP.

According to one of the exemplary embodiments, the image processing device includes a memory circuit and a processing circuit. The memory circuit is configured to store data. The processing circuit is configured to receive a designated distortion value and a maximum bit-rate value, estimate a Lagrange multiplier and a QP of a current frame among a sequence of video frames according to the designated distortion value and the maximum bit-rate value, and encode the current frame according to the estimated Lagrange multiplier and the estimated QP.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
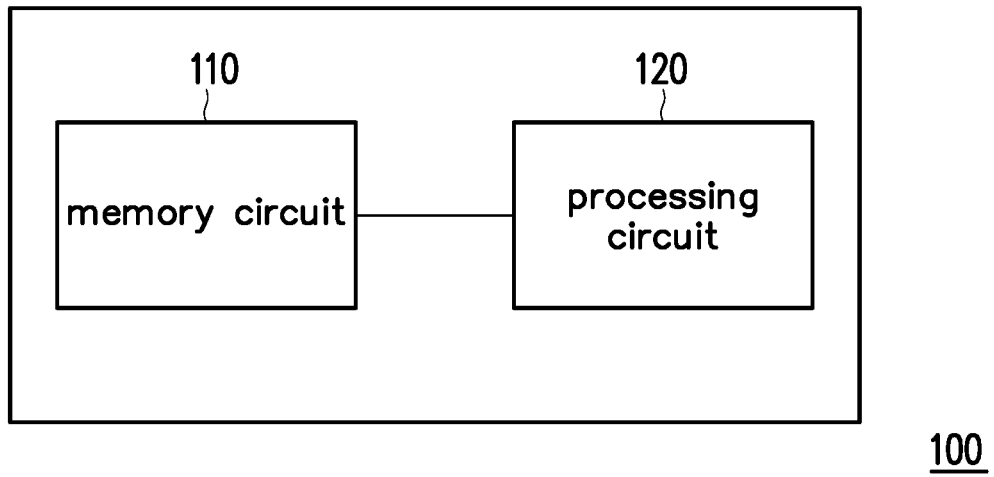
FIG. 1 illustrates a schematic diagram of a proposed image processing device in accordance with one of the exemplary embodiments of the disclosure.

To make the above features and advantages of the application more comprehensible, several embodiments accompanied with drawings are described in detail as follows.

DESCRIPTION OF THE EMBODIMENTS

Variable bit-rate (VBR) is an encoding scheme that is used in communication and computing to achieve improved audio and video quality. VBR media files vary the amount of output data per time segment. VBR allows a higher bitrate to be allocated to the more complex segments while a lower bitrate to be allocated to the less complex segments. VBR is created using a one-pass encoding scheme or a multi-pass encoding scheme. In the one-pass encoding scheme, the data is analyzed and encoded "on the fly", and therefore such scheme is used when the encoding speed is important. In the two-pass encoding scheme, the most common multi-pass encoding scheme, the input data is pre-encoded and the result is stored in a log file in the first pass, and the collected data from the first pass is used to achieve the best quality, and therefore such scheme is used when the encoding quality is important. In other words, the multi-pass encoding scheme cannot be used in real-time encoding or live streaming. In addition, the R-$\lambda$ model that describes the relationship between the bit-rate and the Lagrange multiplier has been proven to provide better rate control with respect to a target bit-rate. However, the encoding quality is not guaranteed.

For attempting to resolve the aforesaid issues, a real-time VBR scheme with controllable quality and bit-rate are proposed in the disclosure. Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a schematic diagram of a proposed image processing device in accordance with one of the exemplary embodiments of the disclosure. All components of the image processing device and their configurations are first introduced in FIG. 1. The functionalities of the components are disclosed in more detail in conjunction with FIG. 2.

Referring to FIG. 1, an image processing device 100 would include a memory circuit 110 and a processing circuit 120 coupled thereto in the present exemplary embodiment. The image processing device 100 may be implemented as an integrated circuit (IC) or a computer system. The memory circuit 110 would be configured to store data such as programming codes, device configurations, images, and so forth and may be implemented using any memory technology. The processing circuit 120 would be configured to implement functional elements of the proposed method in the following exemplary embodiments.

Figure 2:
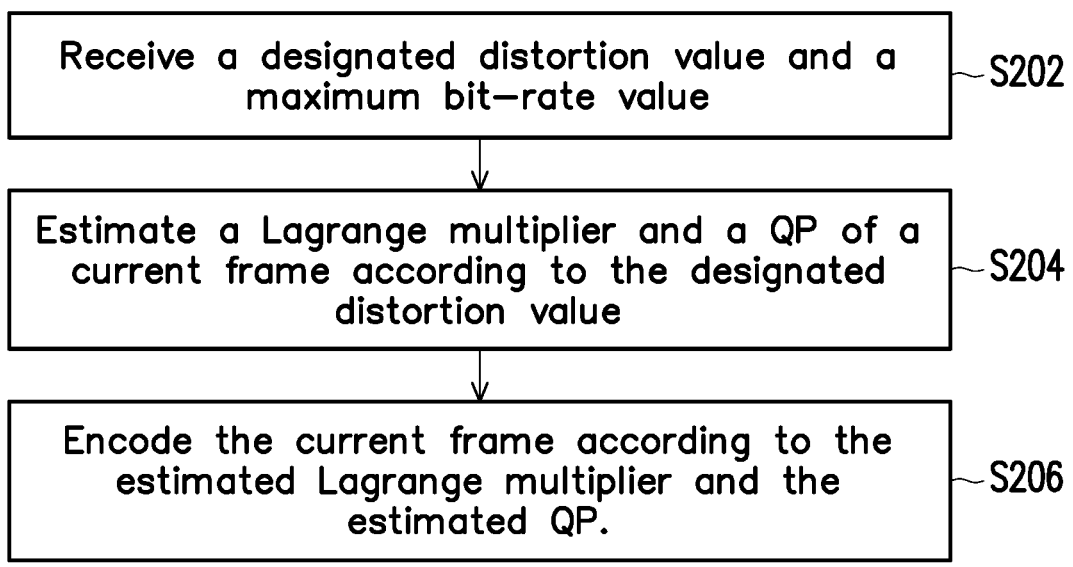
FIG. 2 illustrates a flowchart of a proposed method for video bit-rate control in accordance with one of the exemplary embodiments of the disclosure.

FIG. 2 illustrates a flowchart of a proposed method for video bit-rate control in accordance with one of the exemplary embodiments of the disclosure. The steps of FIG. 2 could be implemented by the proposed image processing device 100 as illustrated in FIG. 1.

Referring to FIG. 2 in conjunction to FIG. 1, the processing circuit 120 of the image processing device 100 would receive a designated distortion value and a maximum bit-rate value (Step S202). Herein, the designated distortion value may represent a target encoding quality and may be designated by the user or system default. The maximum bit-rate value may represent the upper limit that the user, networks, or applications can accept and may also be designated by the user or system default.

Next, the processing circuit 120 would estimate a Lagrange multiplier and a QP of a current frame among a sequence of video frames according to the designated distortion value and the maximum bit-rate value (Step S204) and encode the current frame according to the estimated Lagrange multiplier and the estimated QP (Step S206). Herein, the processing circuit 120 may estimate the Lagrange multiplier of the current frame according to the designated distortion value and a distortion-lambda relation model that describes a relationship between the distortion and the Lagrange multiplier. Next, the processing circuit 120 may further estimate the QP of the current frame according to a lambda-QP relation model that describes a relationship between the Lagrange multiplier and the QP. Note that the QP would regulate how much spatial detail is retained in the current frame. Under an acceptable distortion value (i.e. a desired encoding quality), a suitable QP would be determined for encoding the current frame according to the aforesaid relation models.

It should be noted that, the information of the encoded current frame would be further used for model update in order to provide a stable and real-time quality control for the rest of the video frames in the sequence. For better comprehension, FIG. 3 illustrates a flowchart of a proposed method for video bit-rate control in accordance with another one of the exemplary embodiments of the disclosure.

Figure 3:
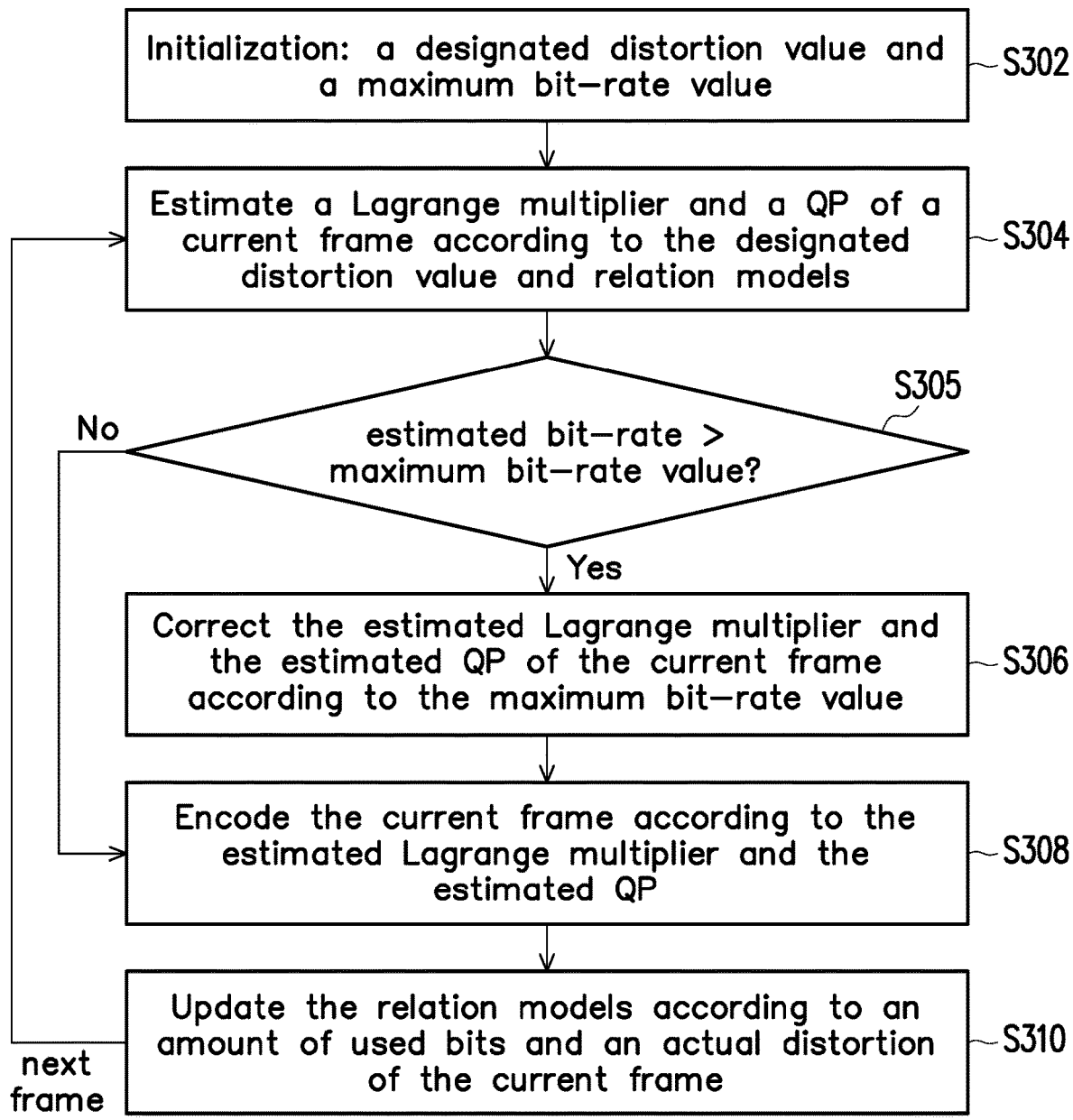
FIG. 3 illustrates a flowchart of a proposed method for video bit-rate control in accordance with one of the exemplary embodiments of the disclosure.

Referring to FIG. 3 in conjunction to FIG. 1, the processing circuit 120 of the image processing device 100 would receive a designated distortion value and a maximum bit-rate value as an initialization process (Step S302). The details of Step S302 have been described in Step S202 and would not be repeated herein for brevity purposes. Next, the processing circuit 120 would estimate a Lagrange multiplier and a QP of a current frame among a sequence of video frames according to the designated distortion value and relation models (Step S304), where the relation models would be a distortion-lambda relation model and a lambda-QP relation model.

In the present exemplary embodiment, the distortion-lambda relation model may be derived from a distortion-rate function under the mean-squared error (MSE) distortion criterion as expressed in Eq.(1) and a negative derivative of the distortion-rate function with respect to bit-rate as expressed in Eq.(2):

$$D(R) = CR^{-K} \qquad \text{Eq.(1)}$$

$$\lambda = -\frac{\partial D}{\partial R} = C \times K \times R^{-K-1} \qquad \text{Eq.(2)}$$

Herein, $D(R)$ denotes the distortion-rate function, and R denotes the bit-rate, i.e. an amount of used bits to encode over a set length of time. C and K denote first and second relation model parameters that change according to video content. $\lambda$ denotes the Lagrange multiplier. According to Eq.(1) and Eq.(2), the distortion-lambda relation model may be represented by Eq.(3):

$$\lambda = C \times K \times \left(\frac{D}{C}\right)^{1+\frac{1}{K}} \qquad \text{Eq.(3)}$$

That is, the distortion-lambda relation model would describe a relationship between the distortion and the Lagrange multiplier with the first model parameter and the second model parameter of the distortion-rate function.

On the other hand, the lambda-QP relation model may be represented by Eq.(4) as known per se:

$$QP = c_1 \times \ln(\lambda) + c_2 \qquad \text{Eq.(4)}$$

Herein, $c_1$ and $c_2$ denote two constants. That is, the lambda-QP relation model would describe a relationship between the Lagrange multiplier and the QP with constants.

The processing circuit 120 would estimate the Lagrange multiplier of the current frame by plugging the designated distortion value into D in the distortion-lambda relation model Eq.(3) with the known first and second relation model parameters C and K. The processing circuit 120 would next estimate the QP of the current frame by plugging the estimated Lagrange multiplier into $\lambda$ in Eq.(4) with known constants $c_1$ and $c_2$.

Before encoding is performed on the current frame, the processing circuit 120 would determine whether to correct the estimated Lagrange multiplier and the estimated QP according to the maximum bit-rate value. Herein, the processing circuit 120 would determine whether an estimated bit-rate to be used for encoding the current frame is greater than the maximum bit-rate (Step S305). When the estimated bit-rate is not greater than the maximum bit-rate, no correction is required on the estimated Lagrange multiplier and the estimated QP, and the processing circuit 120 would encode the current frame according to the estimated Lagrange multiplier and the estimated QP (Step S308).

On the other hand, when the estimated bit-rate is greater than the maximum bit-rate, the processing circuit 120 would correct the estimated Lagrange multiplier and the estimated QP such that the estimated bit-rate to be used for encoding the current frame would not exceed the maximum bit-rate. In one exemplary embodiment, the processing circuit 120 may correct the estimated Lagrange multiplier by slight adjustment according to Eq.(2) to ensure that R≤Rmax, where Rmax denotes the maximum bit-rate. In another exemplary embodiment, the processing circuit 120 may correct the estimated Lagrange multiplier by forcing R=Rmax in Eq.(2). The processing circuit 120 may next correct the estimated QP by plugging the corrected Lagrange multiplier into Eq.(4). The processing circuit would the use the corrected Lagrange multiplier and the corrected QP as the estimated Lagrange multiplier and the estimated QP to encode the current frame in Step S308.

After encoding the current frame, the processing circuit 120 would update the distortion-lambda relation model according to an amount of used bits and an actual distortion of the encoded current frame (Step S310) for a next frame following the current frame. In the present exemplary embodiment, the first and second relation model parameters C and K in the distortion-lambda relation model may be updated according to the actual amount of used bits, the actual distortion, the estimated Lagrange multiplier, and the estimated QP used to encode the current frame in Step S308 according to Eq.(1)-(3). In other words, the distortion-lambda relation model may be updated based on the previously encoded frame so that a stable and real-time quality control could be attained. In addition, the actual bit-rate used to encode the current frame may also be recorded for further analysis and usage.

Figure 4:
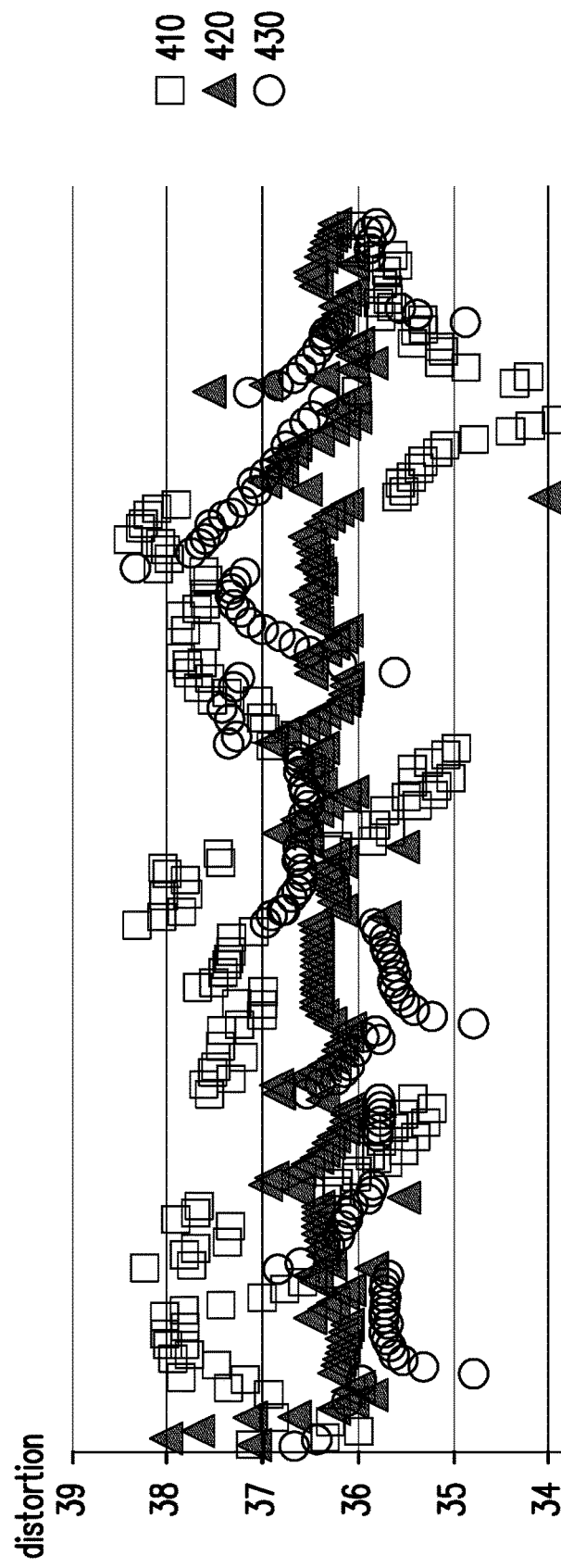
FIG. 4 illustrates a graph of distortions of a sequence of video frames on a monitored area with respect to three different encoding schemes.
Figure 4:
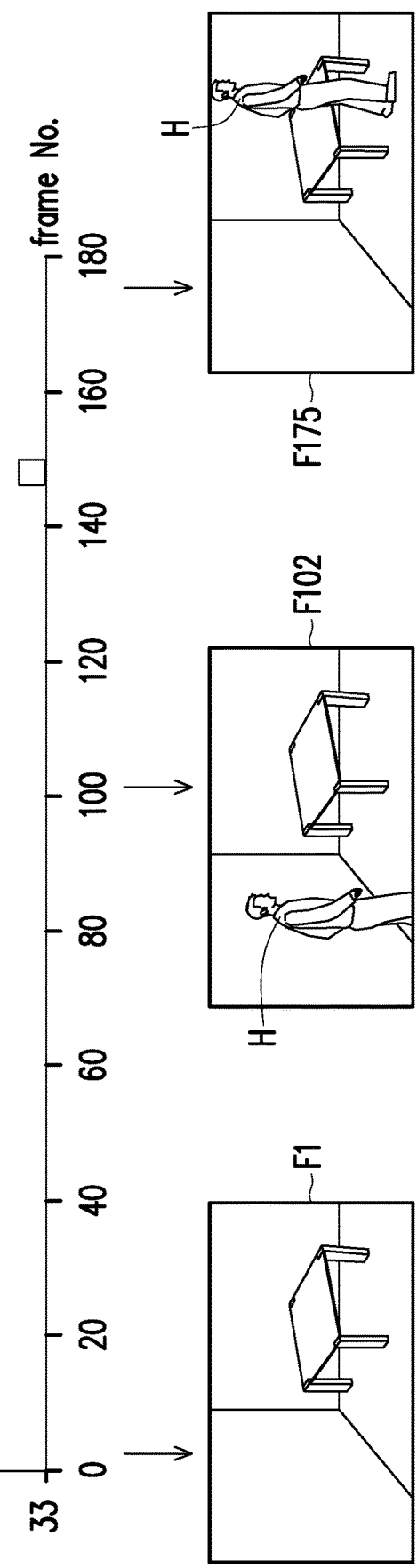

FIG. 4 illustrates a graph of distortions of a sequence of video frames on a monitored area with respect to three different encoding schemes.

Referring to FIGS. 4, 410, 420, and 430 represent distortions measured in terms of peak signal-to-noise ratios (PSNR) of a sequence of video frames with respect to a constant bit-rate (CBR) encoding scheme, the proposed VBR encoding scheme with constant distortion (quality), and a fixed-QP encoding scheme with QP=30. In the present exemplary embodiment, the same average bit-rate is used for the three encoding schemes. The qualities performed by the three encoding schemes are reliable for the three encoding schemes when no movement is involved such as a frame F1. However, only the qualities performed by the proposed VBR encoding scheme remains stable with less fluctuation while the movement caused by human H is detected such as frames F102 and F175 as opposed to the CBR encoding scheme and the fixed-QP encoding scheme.

In view of the aforementioned descriptions, the proposed method and image processing device provide a real-time VBR scheme where no pre-processing is required and encoding quality is ensured.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for video bit-rate control comprising:
   receiving a designated distortion value and a maximum bit-rate value;
   estimating a Lagrange multiplier and a quantization parameter (QP) of a current frame among a sequence of video frames according to the designated distortion value and the maximum bit-rate value; and
   encoding the current frame according to the estimated Lagrange multiplier and the estimated QP.

2. The method according to claim 1, wherein the step of estimating the Lagrange multiplier and the QP of the current frame among the sequence of video frames according to the designated distortion value and the maximum bit-rate value comprises:
   estimating the Lagrange multiplier of the current frame according to the designated distortion value and a distortion-lambda relation model;
   estimating the QP of the current frame according to the estimated Lagrange multiplier and a lambda-QP relation model; and
   determining whether to correct the estimated Lagrange multiplier and the estimated QP according to the maximum bit-rate value.

3. The method according to claim 2, wherein the distortion-lambda relation model is derived from a distortion-rate function and a negative derivative of the distortion-rate function with respect to bit-rate.

4. The method according to claim 3, wherein the distortion-lambda relation model describes a relationship between the distortion and the Lagrange multiplier with a first model parameter and a second model parameter of the distortion-rate function.

5. The method according to claim 2, wherein the lambda-QP relation model describes a relationship between the Lagrange multiplier and the QP with constants.

6. The method according to claim 2, wherein the step of determining whether to correct the estimated Lagrange multiplier and the estimated QP according to the maximum bit-rate value comprises:
   estimating a bit-rate to be used for encoding the current frame according to the estimated Lagrange multiplier and the estimated QP;
   determining whether the estimated bit-rate is greater than the maximum bit-rate;
   in response to the estimated bit-rate being greater than the maximum bit-rate, correcting the estimated Lagrange multiplier and the estimated QP; and
   in response to the estimated bit-rate not being greater than the maximum bit-rate, not correcting the estimated Lagrange multiplier and the estimated QP.

7. The method according to claim 6, wherein the step of correcting the estimated Lagrange multiplier and the estimated QP comprises:
   correcting the estimated Lagrange multiplier according to the maximum bit-rate value and a negative derivative of a distortion-rate function with respect to bit-rate;
   correcting the estimated QP according to the corrected Lagrange multiplier and the lambda-QP relation model; and
   setting the corrected Lagrange multiplier and the corrected QP as the estimated Lagrange multiplier and the estimated QP.

8. The method according to claim 2, wherein after the step of encoding the current frame according to the estimated Lagrange multiplier and the estimated QP, the method further comprises:
  updating the distortion-lambda relation model according to an amount of used bits and an actual distortion of the encoded current frame.

9. The method according to claim 8, wherein the step of updating the distortion-lambda relation model according to the amount of used bits and the actual distortion of the encoded current frame comprises:
  updating model parameters of the distortion-lambda relation model corresponding to a next frame following the current frame in the sequence of video frames according to the amount of used bits and the actual distortion of the encoded current frame, the estimated Lagrange multiplier, and the estimated QP.

10. An image processing device comprising:
  a memory circuit, configured to store data; and
  a processing circuit, coupled to the memory circuit and configured to receive a designated distortion value and a maximum bit-rate value, estimate a Lagrange multiplier and a quantization parameter (QP) of a current frame among a sequence of video frames according to the designated distortion value and the maximum bit-rate value, and encode the current frame according to the estimated Lagrange multiplier and the estimated QP.

11. The image processing device according to claim 10, wherein the processing circuit is configured to estimate the Lagrange multiplier of the current frame according to the designated distortion value and a distortion-lambda relation model, estimate the QP of the current frame according to the estimated Lagrange multiplier and a lambda-QP relation model, and determine whether to correct the estimated Lagrange multiplier and the estimated QP according to the maximum bit-rate value.

12. The image processing device according to claim 11, wherein the distortion-lambda relation model is derived from a distortion-rate function and a negative derivative of the distortion-rate function with respect to bit-rate.

13. The image processing device according to claim 12, wherein the distortion-lambda relation model describes a relationship between the distortion and the Lagrange multiplier with a first model parameter and a second model parameter of the distortion-rate function.

14. The image processing device according to claim 11, wherein the lambda-QP relation model describes a relationship between the Lagrange multiplier and the QP with constants.

15. The image processing device according to claim 11, wherein the processing circuit is configured to estimate a bit-rate to be used for encoding the current frame according to the estimated Lagrange multiplier and the estimated QP, determine whether the estimated bit-rate is greater than the maximum bit-rate, correct the estimated Lagrange multiplier and the estimated QP in response to the estimated bit-rate being greater than the maximum bit-rate, and not correct the estimated Lagrange multiplier and the estimated QP in response to the estimated bit-rate not being greater than the maximum bit-rate.

16. The image processing device according to claim 15, wherein the processing circuit is configured to correct the estimated Lagrange multiplier according to the maximum bit-rate value and a negative derivative of a distortion-rate function with respect to bit-rate, correct the estimated QP according to the corrected Lagrange multiplier and the lambda-QP relation model, and set the corrected Lagrange multiplier and the corrected QP as the estimated Lagrange multiplier and the estimated QP.

17. The image processing device according to claim 11, wherein the processing circuit is further configured to update the distortion-lambda relation model according to an amount of used bits and an actual distortion of the encoded current frame.

18. The image processing device according to claim 17, wherein the processing circuit is configured to update model parameters of the distortion-lambda relation model corresponding to a next frame following the current frame in the sequence of video frames according to the amount of used bits and the actual distortion of the encoded current frame, the estimated Lagrange multiplier, and the estimated QP.

* * * * *